(12) United States Patent
Ukigaya

(10) Patent No.: US 7,057,798 B2
(45) Date of Patent: Jun. 6, 2006

(54) DISPLAY APPARATUS

(75) Inventor: Nobutaka Ukigaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/839,028

(22) Filed: May 4, 2004

(65) Prior Publication Data
US 2005/0002088 A1    Jan. 6, 2005

(30) Foreign Application Priority Data
May 7, 2003    (JP)    ............................... 2003-129488

(51) Int. Cl.
*G02B 26/00* (2006.01)
(52) U.S. Cl. .................... 359/296; 359/267; 345/107; 430/32
(58) Field of Classification Search ............ 315/169.1; 359/245, 263, 252, 253, 267, 277, 295, 296; 345/84, 107; 430/32, 38; 204/450, 451
See application file for complete search history.

(56) References Cited

U.S. PATENT DOCUMENTS

| | | | |
|---|---|---|---|
| 5,742,368 A | 4/1998 | Chen | ........................ 349/117 |
| 6,130,774 A | 10/2000 | Albert et al. | ................ 359/296 |
| 6,215,920 B1 * | 4/2001 | Whitehead et al. | ........... 385/18 |
| 6,850,357 B1 * | 2/2005 | Kaneko et al. | ............. 359/296 |
| 6,865,010 B1 * | 3/2005 | Duthaler et al. | ............ 359/296 |
| 6,885,496 B1 * | 4/2005 | Whitehead et al. | ......... 359/296 |

FOREIGN PATENT DOCUMENTS

| | | |
|---|---|---|
| JP | 11-202804 A | 7/1999 |
| WO | 99/10768 A | 3/1999 |

* cited by examiner

*Primary Examiner*—Haissa Philogene
(74) *Attorney, Agent, or Firm*—Morgan & Finnegan, LLP

(57) ABSTRACT

An apparatus includes a substrate, charged particles, a transparent electrode disposed in parallel with a surface of the substrate, an electrode disposed at a periphery of the transparent electrode, means for applying a voltage between the transparent electrode and the electrode disposed at the periphery thereof to move the charged particles laterally, a reflection surface for reflecting light incident onto in the substrate, and a light scattering or absorption layer disposed between the transparent electrode and the reflection surface. The apparatus is effective in providing a desired scattering ability without increasing a drive voltage.

17 Claims, 1 Drawing Sheet

DISPLAY APPARATUS

FIELD OF THE INVENTION AND RELATED ART

The present invention relates to a display apparatus, particularly an electrophoretic display apparatus which effects display based on movement of charged particles.

Electrophoretic display apparatuses having various structures have been conventionally proposed with respect to such an electrophoretic display apparatus for performing display based on movement of charged particles.

For example, Japanese Laid-Open Patent Application (Tokkaihei) 11-202804 and (Tokuhyo) 2002-504696 have disclosed an electrophoretic display apparatus in which an insulating liquid, charged particles and electrodes are disposed between a pair of substrates disposed with a spacing therebetween and the charged particles are moved by applying a voltage to the electrodes.

The electrophoretic display apparatuses include those of a reflection type and a transmission type. In the case of the reflection type electrophoretic display apparatus, a scattering layer is disposed on a rear substrate so as to scatter light incident from an image viewer side.

The scattering layer may preferably have a larger thickness in order to improve a resultant luminance.

However, the scattering layer has insulating properties and is disposed between electrodes, so that a drive voltage is increased if the thickness of the scattering layer is larger. As a result, there is a possibility of an increase in power consumption.

SUMMARY OF THE INVENTION

An object of the present invention is to provide a display apparatus capable of suppressing an increase in drive voltage.

Another object of the present invention is to provide a display apparatus capable of improving a luminance.

According to the present invention, there is provided apparatus including a substrate, charged particles, a transparent electrode (first electrode) disposed in parallel with a surface of the substrate, an electrode (second electrode) disposed at a periphery of the transparent electrode, means for applying a voltage between the transparent electrode and the electrode disposed at the periphery thereof to move the charged particles laterally, a reflection surface for reflecting light externally incident onto the substrate, and a light scattering or absorption layer (first scattering layer) disposed between the transparent electrode and the reflection surface.

In the apparatus, the scattering layer is disposed between the first electrode (transparent electrode) and the reflection surface. Accordingly, it is possible to narrow a spacing between the first electrode and the second electrode, so that a drive voltage becomes small. In the present invention, another (second) scattering layer may be disposed between the first and second electrodes. In this case, the resultant scattering layer can be made thin, so that it is possible to suppress an increase in drive voltage. Further, the entire thickness of the scattering layers can be made thick by the presence of the first scattering layer. As a result, a resultant luminance is improved.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, embodiments of the apparatus according to the present invention will be described with reference to FIGS. 1 and 2.

Figure 1:
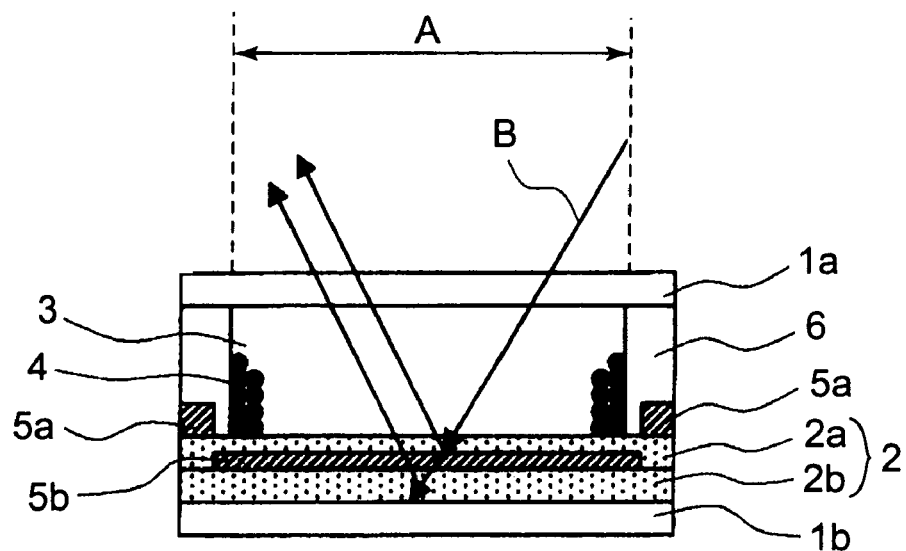
FIGS. 1 and 2 are respectively a schematic sectional view showing an embodiment of an apparatus (electrophoretic display apparatus) according to the present invention.

FIG. 1 shows an embodiment of an electrophoretic display apparatus as the apparatus of the present invention.

Referring to FIG. 1, an electrophoretic display apparatus D1 includes a pair of first and second substrates 1a and 1b, a scattering layer 2 disposed on the second substrate 1b, a plurality of charged particles 4 and an insulating liquid 3 which are disposed between the first substrate 1a and the scattering layer 2, and a first electrode 5a and the second electrode 5b which are disposed in the vicinity of the insulating liquid 3. In the apparatus D1, the charged particles 4 are moved by applying a voltage between the first and second electrodes 5a and 5b to effect display. By the movement of the charged particles 4, two display states including a state wherein the second electrode 5a is covered with the charged particles 4 and a state wherein the second electrode 5a is exposed are generated.

The above-described scattering layer 2 is used to scatter light B and includes a first scattering layer 2a disposed between the second electrode 5b and the insulating liquid 3 and a second scattering layer 2b disposed to sandwich the second electrode 5b with the first scattering layer 2a. The thickness of the first scattering layer 2a is set in the range of 0.1–20 μm, and the thickness of the second scattering layer 2b is set in the range of 100–1000 μm. As a material for these scattering layers 2a and 2b, it is possible to use a transparent insulating resin containing high-reflective fine in particles. As the fine particles, those of titanium oxide and $Al_2O_3$ can be used. As the transparent resin, it is possible to use acrylic resin, urethane resin, fluorine-containing resin, norbornene resin, polycarbonate (PC), polyethylene terephthalate (PET), etc.

Figure 2:
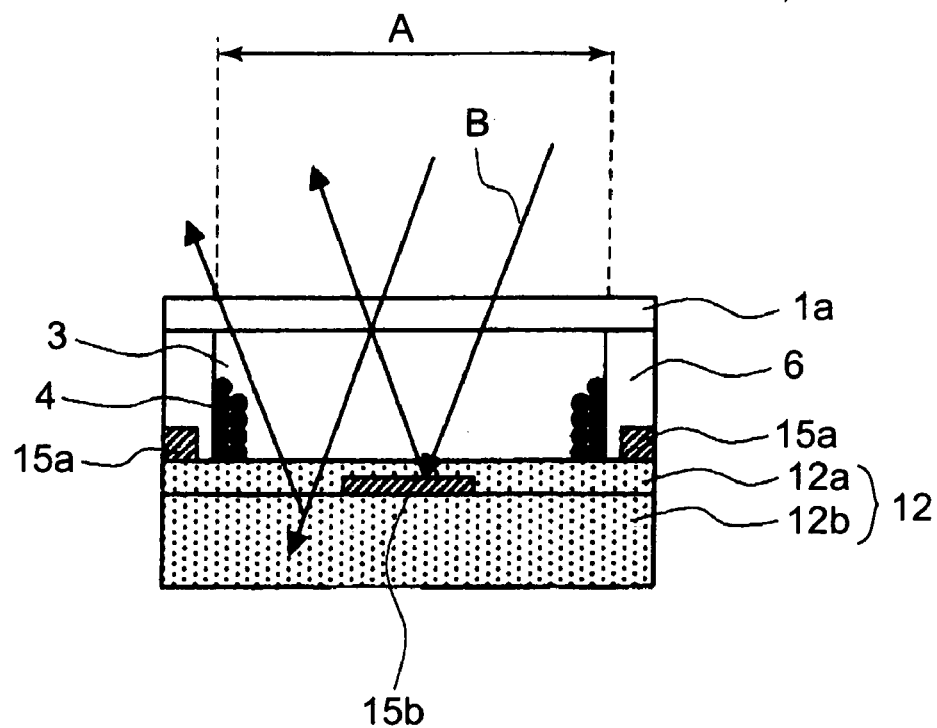

In the case where the scattering layer 2 (2a, 2b) has a sufficient thickness or strength, as indicated by reference numerals 12a, 12b, 22a and 22b in FIG. 2, the scattering layers 12a and 12 (22a and 22b) may be disposed to support a second electrode 15b (25b) or seal up the insulating liquid 3. If the scattering layer 2 does not have a sufficient thickness or strength, as shown in FIG. 1, the scattering layer 2 may be supported by the second substrate 1b disposed in parallel with the first substrate 1a. In this case, a reflection layer (not shown) may be disposed between the scattering layer 2 and the second substrate 1b so as to reflect light.

The scattering layer 2 may be colored for color display. For example, scattering layers colored three colors of red (R), green (G) and blue (B) may be regularly arranged to constitute a color display apparatus. Alternatively, the surface of the second substrate 1b may be made a diffuse reflector (diffuse reflection surface) so as to cause light scattering at the substrate surface, so that the scattering layers in 2a and 2b may be modified to simple color filter layers (having no light scattering function). In either case, the lower scattering layer 2b can be made thicker, so that it is possible to arbitrarily set a light scattering function or a color filter function depending on the thickness of scattering layer.

Further, between adjacent two pixels A (only one pixel A is shown in FIGS. 1 and 2 for convenience), a partition member 6 is disposed so as to partition the pixels A, thus preventing the insulating liquid 2 or the charged particles 4 from moving into another (adjacent) pixel. The partition member 6 shown in FIGS. 1 and 2 is a plate-like member extending in a thickness direction of the first and second substrates 1a and 1b but may have a microcapsule shape.

In the case of the electrophoretic display apparatus D1 shown in FIG. 1, the first electrode 5a is disposed at a boundary portion of the pixel A, i.e., between the partition member 6 and the scattering layer 2a, and the second electrode 5b is disposed over the entire pixel A. In this case, the second electrode 5b may preferably be formed of a light transmissive material. As a result, light B incident from the first substrate 1a side passes through the insulating liquid 3 and the second electrode 5b and is reflected or scattered by the first scattering layer 2a and/or the second scattering layer 2b. Incidentally, the second electrode 5b may be formed of a non-light transmissive material. In such a case, however, as shown in FIG. 2, the second electrode 15b is required to be disposed in a narrow area.

In order to control a distribution sate of the charged particles 4, it is necessary to appropriately form a potential gradient between the first electrodes 5a, . . . and the second electrodes 5b, . . . For example, in order to permit visual identification of only a color of colored charged particles 4, the charged particles 4 may be distributed so as to cover the scattering layers 2, . . . In order to realize a bright display by utilizing reflected light from the scattering layer, 2, . . . , it is preferred that the scattering layers 2, . . . are exposed to light.

The charged particles 4 used in the present invention may preferably have an average particle size of 0.1–10 μm. A colorant (coloring agent) used in the present invention is not particularly limited. Examples thereof may include carbon black, titanium oxide, barium sulfate, nigrosine, iron black, aniline blue, calco oil blue, chrome yellow, ultramarine blue, Dupont oil red, quinoline yellow, methylene blue chloride, phthalocyanine blue, phthalocyanine green, in sky blue, rhodamine lake, etc.

As a resin for the charged particles 4, it is possible to use polymeric materials including: polyethylene-based resins such as polystyrene, polyethylene, polyester, polymethacrylate, polyacrylate, polyacrylic ester, ethylene-acrylic acid copolymer, ethylene-methacrylic acid copolymer, and ethylene-vinyl acetate copolymer; polyvinyl chloride, nitrocellulose; phenolic resin; and polyamide. These materials may be used singly or in combination of two or more species.

As the insulating liquid 3, it is possible to use an organic solvent having a low electro-conductivity, i.e., high insulating properties. Examples thereof may include: aromatic hydrocarbon solvents such as benzene, toluene, xylene and naphthenic acid-based hydrocarbons; aliphatic hydrocarbon solvents, such as hexane, cyclohexane, paraffin-based hydrocarbons, and isoparaffin-based hydrocarbons; halogenated hydrocarbons; silicone oil; and high-purity petroleum.

The insulating liquid 2 may contain a charge control agent, as desired. Examples thereof may include: anionic surfactants, such as carboxylates, sulfonates, sulfates, and phosphates; cationic surfactants, such as aliphatic amine salts and their quaternary ammonium salts, aromatic quaternary in ammonium salts, and heterocyclic quaternary ammonium salts; amphoteric surfactants, such as carboxy betains, sulfobetaines, aminocarboxylates, and imidazoline derivatives; nonionic surfactants, such as those of an ester type, an ester type, and a nitrogen-containing type; fluorine-containing surfactants; and reactive surfactants. These surfactants may be used singly or in mixture of two or more species.

According to the above described embodiments, the scattering layer 2 is constituted by the first scattering layer 2a disposed between the second electrode 5b and the insulating liquid 3 and the second scattering layer 2b disposed to sandwich the second electrode 5b in combination with the first scattering layer 2a. Accordingly, the first scattering layer 2a disposed between the first and second electrodes 5a and 5b can be made thin, so that it is possible to prevent an increase in drive voltage. Further, by the presence of the second scattering layer 2b, the thickness of the entire scattering layer (2a and 2b) can be made thick. Accordingly, a resultant luminance can be improved.

Hereinbelow, the present invention will be described more specifically based on Examples.

EXAMPLE 1

An electrophoretic display apparatus D1 having the structure shown in FIG. 1 was prepared in in the following manner.

A first substrate 1a and a second substrate 1b were disposed with a predetermined spacing. On the surface of the second substrate 1b, a scattering layer 2b, a second electrode 5b, and a scattering layer 2a were disposed in this order. At a boundary between adjacent pixels A, a first electrode 5a and a partition (wall) member 6 were disposed so as to partition the pixels A (in FIG. 1, only one pixel A is shown for convenience). At each pixel A, an insulating liquid 3 and charged particles 4 were disposed.

As a material for the scattering layers 2a and 2b, an urethane resin containing titanium oxide having a particle size of 0.5 μm was used and formed in a white scattering layer. The scattering layer 2a had a thickness of 3 μm and the scattering layer 2b had a thickness of 500 μm. The second electrode 5b was formed of transparent ITO (indium tin oxide) and disposed over the entire pixel. The partition member 6 was formed of epoxy-based photosensitive resin. The surfaces of the partition member 6 and the scattering layer 2 were coated with a thin transparent acrylic resin (not shown). The partition member 6 and the first substrate 1a were adhered to each other with a UV-curable adhesive. The insulating liquid 3 principally comprised a paraffin-based hydrocarbon, and the charged particle 4 comprised black particles of a polystyrene resin containing carbon black.

When the electrophoretic display apparatus was driven, a drive voltage could be lowered to ±10 V and it was possible to realize a maximum reflectance of 45%.

EXAMPLE 2

An electrophoretic display apparatus D2 having the structure shown in FIG. 2 was prepared in the same manner as in Example 1 except for the following points.

The second substrate 1b was not used, and scattering layers 12a and 12b were used as a support instead of the second substrate 1b. A second electrode 15b was formed of aluminum and disposed in an area having an area portion of 20% per the entire pixel A area. A 1 mm-thick scattering layer 12b was formed of PET (polyethylene terephthalate) containing titanium oxide, and a 2 mm-thick scattering layer 12a was formed of an acrylic resin containing titanium oxide.

When the electrophoretic display apparatus was driven, a drive voltage could be lowered to ±8 V and it was possible to realize a maximum reflectance of 46%.

What is claimed is:

1. An apparatus, comprising:
   a substrate,
   charged particles disposed in parallel with said substrate,
   a transparent electrode disposed in parallel with a surface of said substrate,
   an electrode disposed at a periphery of said transparent electrode,
   means for applying a voltage between said transparent electrode and said electrode disposed at the periphery thereof to move said charged particles laterally,
   a reflection surface for reflecting light incident onto said substrate, and
   a light scattering or absorption layer disposed between said transparent electrode and said reflection surface.

2. An apparatus according to claim 1, wherein said apparatus further comprises a second light scattering or absorption layer disposed opposite from said light scattering or absorption layer disposed between said transparent electrode and said reflection surface, with respect to said reflection surface.

3. An apparatus according to claim 2, wherein said light scattering or absorption layer is disposed between said transparent electrode and said reflection surface has a thickness larger than that of said opposite light scattering or absorption layer.

4. An apparatus according to claim 1, wherein said light scattering or absorption layer is a light absorption layer comprising a color filter for absorbing a part of visible light of wavelengths.

5. An apparatus according to claim 1, wherein said charged particles are moved between a surface, opposite to the side where said light scattering or absorption layer is disposed, and said electrode disposed at the periphery of said transparent electrode.

6. An apparatus, comprising:
   a substrate,
   charged particles,
   a plurality of transparent electrodes disposed in parallel with said substrate,
   an electrode disposed at a periphery of each of said transparent electrodes,
   means for applying a voltage between said transparent electrodes and said electrode disposed at the periphery thereof to move said charged particles laterally,
   a reflection surface for reflecting light incident onto said substrate, and
   a light scattering or absorption layer disposed between said transparent electrode and said reflection surface,
   wherein said plurality of transparent electrodes are orderly arranged and said electrode disposed at the periphery of each of said transparent electrodes is disposed at a boundary between adjacent transparent electrodes.

7. An apparatus according to claim 6, wherein said apparatus further comprises scanning signal lines and image data signal lines intersecting the scanning signal lines, switching devices each disposed at an intersection of the scanning signal lines and image data signal lines, and a circuit for applying a voltage to said transparent electrodes through the switching devices.

8. An apparatus according to claim 6, wherein said light scattering or absorption layer comprises a material selected from the group consisting of: acrylic resin, urethane resin, fluorine-containing resin, norbornene resin, polycarbonate resin, polyethylene terephthalate resin.

9. An apparatus according to claim 8, wherein said light scattering or absorption layer further comprises a plurality of high-reflective fine particles.

10. An apparatus according to claim 9, wherein the high-reflective fine particles are selected from the group consisting of: titanium oxide and $Al_2O_3$.

11. An apparatus according to claim 10, wherein the high-reflective fine particles are titanium oxide with a particle size of 0.5 μm.

12. An apparatus according to claim 6, wherein said light scattering or absorption layer has red, green and blue regularly arranged thereon.

13. An apparatus according to claim 6, wherein said electrode disposed at the periphery is formed of a light transmissive material.

14. An apparatus according to claim 13, wherein said substrate, said electrode disposed at the periphery and said light scattering or absorption layer are disposed so that a light incident from said substrate passes through said electrode disposed at the periphery and is reflected or scattered by said light scattering or absorption layer.

15. An apparatus according to claim 6, wherein a thickness of said light scattering or absorption layer is set in the range of 0.1 to 20 μm.

16. An apparatus according to claim 6, further comprising a second light scattering or absorption layer disposed opposite from said light scattering or absorption layer disposed between said transparent electrode and said reflection surface, with respect to said reflection surface.

17. An apparatus according to claim 16, wherein a thickness of said second light scattering or absorption layer is set in the range of 100 to 1000 μm.

* * * * *